J. M. WILSON.
MASTER CUT-OUT FOR STORAGE BATTERIES.
APPLICATION FILED JULY 23, 1919.
1,391,232.  Patented Sept. 20, 1921.
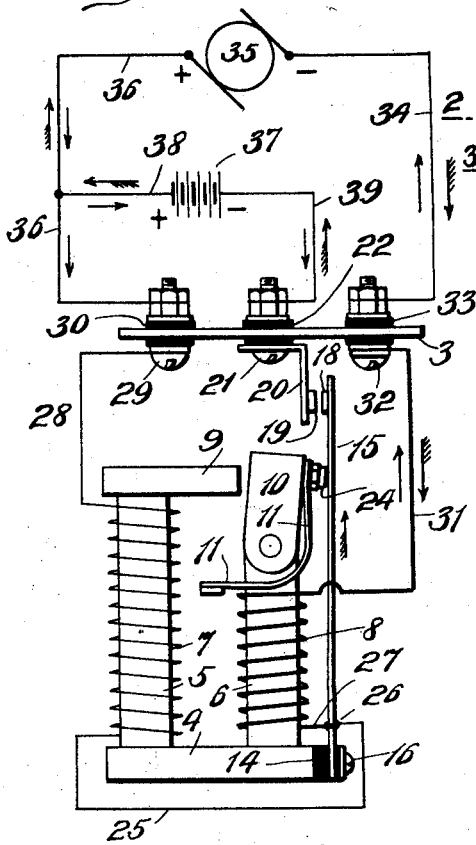
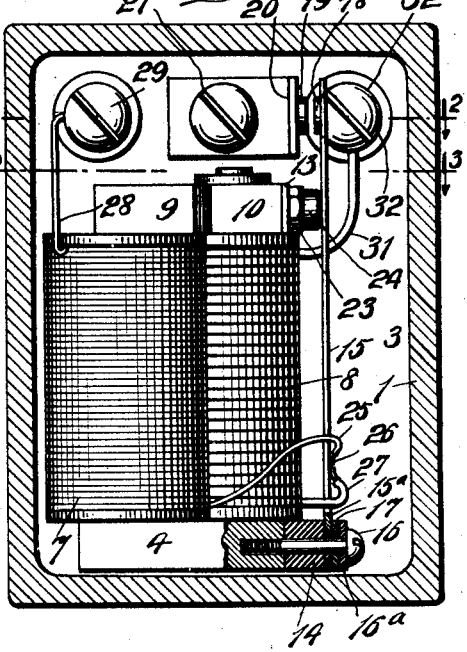
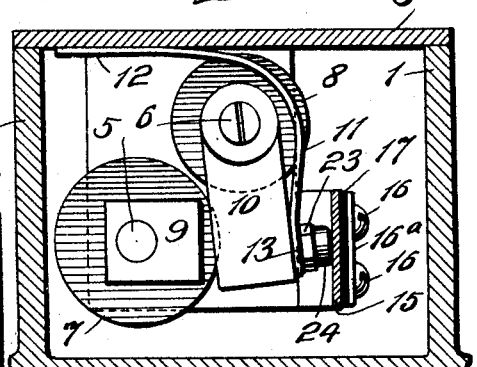
Inventor
James M. Wilson
By his Attorney
M. H. Lockwood

UNITED STATES PATENT OFFICE.

JAMES M. WILSON, OF NEWARK, NEW JERSEY, ASSIGNOR, BY MESNE ASSIGNMENTS, TO HERMAN C. HEIDRICH AND JOHN G. BENDER, BOTH OF NEWARK, NEW JERSEY.

MASTER CUT-OUT FOR STORAGE BATTERIES.

1,391,232.   Specification of Letters Patent.   Patented Sept. 20, 1921.

Application filed July 23, 1919. Serial No. 312,692.

*To all whom it may concern:*

Be it known that I, JAMES M. WILSON, a citizen of the United States, and resident of the city of Newark, county of Essex, and State of New Jersey, have invented certain new and useful Improvements in Master Cut-Outs for Storage Batteries, of which the following is the specification.

My invention relates more particularly to an improved relay or cut-out for use in connection with the ignition and lighting system of an automobile. In systems of this character the engine is adapted to operate a dynamo for charging the storage battery. Since the engine runs at varying speeds the voltage of the dynamo varies accordingly. It is, therefore, necessary and desirable that a suitable cut-out be provided which shall automatically cut-out the battery when the potential of the charging dynamo drops below the potential of the storage battery. If such a cut-out is not provided the current from the battery would flow back through the dynamo and operate it as a motor, thus utilizing the current of the battery uselessly.

In order to avoid this, various forms of cut-outs have been employed, adapted to cut in the storage battery when the potential of the dynamo is sufficiently high to charge the battery, and to cut out the battery when the potential of the dynamo drops below that of the battery. The trouble with cut-outs of this character as previously used, is that the rattle and jar of the automobile in service is apt to cause the contacts to fuse and stick, thereby permitting the battery to discharge through the dynamo and use up the battery unnecessarily.

The object of my improved cut-out is to obviate the trouble and annoyance of having the contacts stick by delivering a hammer or impact blow to the movable contact member so as to loosen the contacts should there be any fusion therebetween. In this manner, the contacts are positively separated and the battery circuit broken, as soon as the potential of the dynamo drops below that of the battery.

My present device is an improvement over the form of device, shown and described in my pending application, Serial No. 256,810, filed October 4, 1918 and illustrated more particularly in Fig. 2, of the drawings thereof.

My improved cut-out may be used in connection with the ordinary battery and self controlled dynamo systems or as a master cut-out in connection with the usual cut-outs. When used in this way it is adapted to automatically insure the protection of the storage battery because I have found that the hammer or impact blow may be depended upon to positively break the connection and prevent discharge of the battery in the manner described.

Another important feature of my master cut-out inherent in the construction thereof, is that I am enabled by proper adjustment of the springs and the connections to insure positive action of the cut-out at all times. This is particularly true if the dynamo should at any time be connected up with the polarity opposed to that of the battery. With my cut-out, if this should occur, the effect would be to close the battery circuit through the dynamo and reverse the polarity thereof without permitting sufficient time to elapse for the contacts to become fused and thus render the cut-out useless, as would be the case with ordinary forms of cut-outs.

My improved cut-out is best shown in the accompanying drawings in which Figure 1 is a plan view looking from the under side, the bottom of the containing case being cut away on the line 1—1 of Fig. 2; Fig. 2 represents a vertical cross-section on the line 2—2 of Fig. 1, looking in the direction of the ends of the magnets. Fig. 3 represents a section on the line 3—3 of Fig. 1, looking toward the end of the magnets, and Fig. 4 represents diagrammatically the device and the connections thereof.

Referring to the drawings, 1 represents the containing case which may be a casting of any suitable material and preferably provided with laterally extending lugs 2 for securing the cut-out in place. The case 1 is covered by a plate 3 of soft iron to which the yoke 4 is secured, the latter projecting into the case 1, as indicated in Figs. 2 and 3 of the drawing. It will be noted that the yoke 4 is rectangular in shape and two poles 5 and 6 are secured thereto at diagonally opposite corners. The pole 5 is wrapped with a coil 7 of fine wire and the pole 6 wrapped with coils of coarse wire 8 as indicated in Figs. 1 and 4 of the drawings.

The pole 5 of the fine wire coil is provided with a pole-end 9, which is fixed and projects laterally in position to coöperate with the pole-end 10, which is pivotally mounted on the end of the pole 6 of the coarse wire windings. By this arrangement it will be seen that if the two poles are magnetized oppositely, the poles 9 and 10 will attract each other and the pole-end 10 being movable laterally, will move toward the pole-piece of the fine wire coil. On the contrary if the poles 5 and 6 are of the same polarity mutual repulsion of the poles 9 and 10 will take place and the pole-end 10 will move away from the pole-end 9. In the construction illustrated I provide a spring 11, resting at 12 on the under-side of the cover plate 3, and connected at 13 with the movable pole-end 10 substantially as indicated in Fig. 3 of the drawings. The spring 11 is preferably arranged to hold the pole-end 10 away from the pole-end 9 and when there is attraction between the pole-ends it is necessary that the attractive force be sufficient to overcome the spring 11 before the pole 10 is moved toward the pole-end 9.

On one edge of the yoke 4 I preferably mount an insulating block 14 and secure thereto the end of a leaf spring or resilient member 15, screws 16 being represented in Fig. 1, as holding the spring and insulation blocks 14 and 17 to the yoke 4, thereby providing a rigid mounting for the end of the resilient member 15 as shown in section in Fig. 1 of the drawings. It will be observed that the construction is such that the end 15ª of the resilient member 15 is completely insulated by the block 14 and the cap or washer 17. The opposite end of the resilient member 15 is free and is provided at 18 with a contact adapted to coöperate with a contact 19 in fixed position to an angle member 20, the horizontal portion of which is electrically connected with the screw 21 which is also utilized to attach the angle member 20 to the under side of the top plate 3 substantially as indicated in Fig. 2 of the drawings. Suitable insulation 22 is provided for separating the screw and contact supporting member from the cover plate 3. The tension of the resilient member 15 is frequently so adjusted that it is adapted to close and hold the contacts 18 and 19 closed when it is free to act without restraint, but as illustrated in the drawings the resilient member is held outward so that the contacts 18 and 19 are separated or opened.

The spring 11 which is preferably connected with the movable pole-end 10 is adjusted and made of sufficient strength to hold the contact member 18 out of contact with 19 when the device is in the idle position as illustrated in the drawings. In order that the spring 11 may accomplish this one end of it is preferably attached to the free end of the movable pole-end 10 by a suitable screw 23, and an insulating plug 24 is secured thereto adapted to engage with the resilient member 15, and hold it in the position indicated in the drawings.

The fine wire coil 7 has its end 25 connected to the resilient member 15 at 26 and the coarse wire coil 8 has its end 27 connected at the same point to the resilient member 15. The opposite end 28 of the fine wire coil 7 is connected with a screw 29, mounted in the top plate 3 as indicated in Figs. 1, 2 and 4 of the drawings, and insulated therefrom by the washer 30. The other end 31 of the coarse wire coil is connected with a screw 32 mounted in the top plate 3 and insulated therefrom by the washer 33, substantially as indicated in the drawings.

The battery and dynamo connections are shown diagrammatically in Fig. 4 of the drawings, where it will be seen that the binding screw 32 is connected by means of the wire 34 with one pole of the dynamo 35. The binding screw 29 is connected by means of the wire 36 with the other pole of the dynamo 35. The storage battery 37 is connected with the dynamo by means of a wire 38 connected with the wire 36 which, as previously stated, is connected with one pole of the dynamo. The opposite pole of the storage battery is connected by the wire 39 with the binding screw 21 which as previously explained is in electrical connection with the fixed contact 19.

The operation of my improvement master cut-out will probably be understood from an examination of the diagram in Fig. 4 of the drawings. It will be seen that normally the contacts 18 and 19 are held open and the dynamo current is adapted to flow into the fine wire coil 7 then through the coarse wire coil 8; through the connection 31 to the binding screw 32 then through wire 34 to the dynamo 35. The windings of the coils 7 and 8 are such that when the current flows in this manner the pole-ends 9 and 10 are of opposite polarity and attract each other.

As the potential of the dynamo rises the pole-end 10, being movable and attracted by the pole-end 9, will move toward the latter and when the potential of the dynamo exceeds a predetermined amount, which should be above the potential of the storage battery, the pole-end 10 will be drawn close to the pole-end 9 so that the hammer knob 24 will move out of the way of the resilient member 15 and permit the latter by its resiliency to bring the contacts 18, 19 together and thereby complete the circuit through the storage battery 37. The direction of the dynamo current under these conditions is indicated by the plain arrows in Fig. 4 of the drawings.

In this manner the battery is charged and the charging will continue until the potential of the dynamo drops below that of the storage battery. When this occurs it will be apparent that the current from the battery will flow back in the opposite direction through the coarse wire coil as indicated by the feathered arrows in Fig. 4 of the drawings. The current from the battery flowing in this manner through the coarse wire coil 8 causes a reversal of the polarity of the pole-end 10, thereby causing repulsion between the poles, and the movable pole-end 10 will be thrown outward under the impulse of the spring 11 and the repulsion between the poles so that the knob 24 will be impelled to give a hammer or impact blow to the resilient member 15 and force the latter against its resiliency and move it and the contact member 18 outward so as to break the battery circuit and cut out the battery.

It will thus be seen that in my improved cut-out there is no possibility of the contacts 18 and 19 permanently sticking for the hammer blow of the pole-end 10 is sufficient to loosen any fusion of the contacts should such occur. However, in view of the fact that the resilient member 15 is adapted to hold the contacts closed under its own spring action and this member is exceedingly light and entirely disconnected from the pole-end, there can be no vibration of the contact member 15 and therefore an imperfect contact between the contacts 18 and 19 is avoided and the possibility of partial fusion would not arise.

Under the most severe test, my improved master cut-out has operated satisfactorily in the manner indicated above and no trouble has ever been experienced with sticking of the contacts and the battery is always promptly cut out as soon as there is a reversal of the current, when the potential of the dynamo drops below that of the battery.

It will be understood that I do not wish to be limited to the specific construction shown for obviously various modifications in specific details of the device may be made without departing from the spirit and scope of the invention.

I claim:

1. In a cut-out of the character described, the combination of a fixed pole-piece and a movable pole-piece coöperating to attract or repel each other to cause one pole-piece to move toward or from the other, a resilient member adjacent said movable pole-piece carrying a contact adapted under the resiliency of said member to be in circuit closing relation with a fixed contact and means whereby said movable pole-piece is adapted, when repelled, to deliver a hammer or impact blow to said member to open said contacts.

2. In a cut-out of the character described, the combination of a fixed pole-piece and a movable pole-piece coöperating to attract or repel each other to cause one pole-piece to move toward or from the other, a resilient member adjacent said movable pole-piece carrying a contact adapted under the resiliency of said member to be in circuit closing relation with a fixed contact, means whereby said movable pole-piece is adapted, when repelled, to deliver a hammer or impact blow to said member to open said contacts, and a spring connected with said movable pole-piece to move it away from said fixed pole-piece adapted to coöperate with the repulsion in delivering said hammer blow.

3. In a cut-out of the character described, the combination of an electro-magnet of fine wire, an electro-magnet of coarse wire, a pole-end pivotally connected to the pole of the coarse wire magnet, and adapted for movement toward and from the pole-end of the fine wire magnet when there is mutual attraction or repulsion therebetween, a spring connected with said pivoted pole-end acting normally to hold the pole-ends apart, a resilient member mounted in a position to be struck and moved by said pivoted pole-end, said member carrying a contact adapted to coöperate with a fixed contact, said contacts being normally held apart by said spring of the pivoted pole-end, and an insulating button on said pole-end adapted to contact with said member in separating the contacts and holding them apart, said pivoted pole-end being adapted to deliver a hammer or impact blow to said member when the pole-ends repel each other.

JAMES M. WILSON.